(12) United States Patent
El-Haj-Mahmoud et al.

(10) Patent No.: US 11,922,177 B2
(45) Date of Patent: *Mar. 5, 2024

(54) SECURELY AND RELIABLY TRANSFERRING STARTUP SCRIPT

(71) Applicant: Hewlett Packard Enterprise Development LP, Houston, TX (US)

(72) Inventors: Samer El-Haj-Mahmoud, Spring, TX (US); Sriram Subramanian, Karnataka (IN); Kevin Depew, Spring, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/482,116

(22) Filed: Sep. 22, 2021

(65) Prior Publication Data

US 2022/0004395 A1 Jan. 6, 2022

Related U.S. Application Data

(63) Continuation of application No. 15/568,410, filed as application No. PCT/US2015/029453 on May 6, 2015, now Pat. No. 11,157,288.

(51) Int. Cl.
*G06F 21/57* (2013.01)
*G06F 8/61* (2018.01)
(Continued)

(52) U.S. Cl.
CPC .......... *G06F 9/4416* (2013.01); *G06F 9/4406* (2013.01); *G06F 21/575* (2013.01);
(Continued)

(58) Field of Classification Search
None
See application file for complete search history.

(56) References Cited

U.S. PATENT DOCUMENTS 7,984,286 B2 7/2011 Zimmer et al.
8,321,655 B2 11/2012 Jones
(Continued)

FOREIGN PATENT DOCUMENTS

CN 102316073 A 1/2012
CN 103164244 A 6/2013
CN 104572169 A 4/2015

OTHER PUBLICATIONS

"Analysis and a Case Study of Transparent Computing Implementation with UEFI," Intel, Oct. 16, 2012, 112 pages, <http://blog.sciencenet.cn/home.php?mod=attachment&filename=transparent-computing-white-paper.pdf&id=64845>.
(Continued)

*Primary Examiner* — Jaweed A Abbaszadeh
*Assistant Examiner* — Cheri L Harrington
(74) *Attorney, Agent, or Firm* — Trop, Pruner & Hu, P.C.

(57) ABSTRACT

A system for securely and reliably transferring startup script files over a network may include a unified extensible firmware interface (UEFI) network stack on a client server wherein the client server requests startup script over the network upon startup of the client server using a secure transfer network protocol and receives over the network the startup script. A computing device may comprise a unified extensible firmware interface (UEFI) shell to request a download of startup script, over a network, upon startup of the client server wherein the startup script is staged in a provisioned storage device within the client server to be mounted as local file systems in the client server. The UEFI shell.

20 Claims, 6 Drawing Sheets (51) Int. Cl.
*G06F 9/4401* (2018.01)
*H04L 9/40* (2022.01)
*H04L 67/00* (2022.01)
*H04L 67/01* (2022.01)
*H04L 67/06* (2022.01)
*H04L 69/328* (2022.01)
*G06F 9/54* (2006.01)
*H04L 61/5014* (2022.01)
*H04L 67/02* (2022.01)

(52) U.S. Cl.
CPC ........ *H04L 63/0272* (2013.01); *H04L 63/166* (2013.01); *H04L 67/01* (2022.05); *H04L 67/06* (2013.01); *H04L 67/34* (2013.01); *H04L 69/328* (2013.01); *G06F 8/63* (2013.01); *G06F 9/547* (2013.01); *H04L 61/5014* (2022.05); *H04L 63/0428* (2013.01); *H04L 67/02* (2013.01)

(56) References Cited

U.S. PATENT DOCUMENTS

| | | | |
|---|---|---|---|
| 9,081,747 B1 | 7/2015 | Tabieros et al. | |
| 9,286,047 B1* | 3/2016 | Avramov | G06F 8/61 |
| 2003/0097553 A1 | 5/2003 | Frye | |
| 2003/0126426 A1 | 7/2003 | Frye | |
| 2004/0199758 A1* | 10/2004 | Meaney | G06F 9/4416 |
| | | | 713/2 |
| 2006/0123223 A1 | 6/2006 | Mayfield et al. | |
| 2006/0129788 A1 | 6/2006 | Maeda et al. | |
| 2006/0200626 A1 | 9/2006 | Gabryjelski | |
| 2007/0214348 A1 | 9/2007 | Danielsen | |
| 2007/0226436 A1 | 9/2007 | Cheng et al. | |
| 2008/0046548 A1* | 2/2008 | Doran | H04L 12/66 |
| | | | 709/222 |
| 2009/0172381 A1 | 7/2009 | Zimmer et al. | |
| 2011/0246626 A1 | 10/2011 | Peterson et al. | |
| 2011/0246985 A1 | 10/2011 | Zhou et al. | |
| 2012/0110312 A1 | 5/2012 | Domsch et al. | |
| 2012/0159137 A1 | 6/2012 | Khosravi et al. | |
| 2013/0254521 A1* | 9/2013 | Bealkowski | H04L 65/40 |
| | | | 713/2 |
| 2013/0290694 A1* | 10/2013 | Civilini | H04L 41/0806 |
| | | | 713/2 |
| 2014/0123136 A1* | 5/2014 | Beda, III | G06F 16/144 |
| | | | 718/1 |
| 2014/0237220 A1 | 8/2014 | O'Rourke et al. | |
| 2014/0281577 A1 | 9/2014 | Nicholes | |
| 2014/0282815 A1 | 9/2014 | Cockrell et al. | |
| 2014/0297999 A1* | 10/2014 | Kim | G06F 9/4401 |
| | | | 713/1 |
| 2014/0304540 A1 | 10/2014 | Rothman et al. | |
| 2015/0019851 A1 | 1/2015 | Alandt et al. | |
| 2015/0040115 A1 | 2/2015 | Capper | |
| 2015/0277986 A1 | 10/2015 | Zhang et al. | |
| 2016/0210161 A1* | 7/2016 | Rosset | G06F 9/4408 |

OTHER PUBLICATIONS

"Introducing the New Intel (Registered) UEFI Devolopment Kit: Industry Foundation for Platform Innovation," Intel, Jul. 5, 2010, 50 pages, <http://www.Intel.la/contant/dam/doo/guide/new-uefi-development-kit.pdf>.

Anonymous: "UEFI System Utilities and Shell Command Mobile Help for HPE ProLiant m510, m710x, and m710x-L Server Blades in HPE Moonshot Systems", available online at <https://techlibrary.hpe.com/docs/iss/proliant_uefi/UEFI_Moonshot_103117/s_webclient.html>, Apr. 2, 2015, 2 pages.

Extended European Search Report received in EP Application No. 15891366.5, dated Jan. 29, 2018, 8 pages.

International Searching Authority, The International Search Report and the Written Openion, PCT/US2015/029453, dated Feb. 24, 2016, 13 Pgs.

Wolfgang Sommergut, "PXE Boot Free: Start the PC over the network," Jan. 12, 2015, 6 pages.

* cited by examiner

Fig. 6

SECURELY AND RELIABLY TRANSFERRING STARTUP SCRIPT

CROSS-REFERENCE TO RELATED APPLICATION

This application is a Continuation of U.S. application Ser. No. 15/568,410, filed on Oct. 20, 2017, which is the National Stage of International Application No. PCT/US2015/029453, filed on May 6, 2015, the content of which are incorporated herein by reference in its entirety. The Applicant hereby rescinds any disclaimer of claim scope in the parent application or the prosecution history thereof and advices the USPTO that the claims in this application may be broader than any claim in the parent application.

BACKGROUND

Unified extensible firmware interface (UEFI) is a specification that defines a software interface between an operating system and platform firmware. The UEFI specification may be used in situations where BIOS services are to be used, remote diagnostics are to be made, and repairs on computing devices are to be done.

BRIEF DESCRIPTION OF THE DRAWINGS

The accompanying drawings illustrate various examples of the principles described herein and are a pad of the specification. The examples do not limit the scope of the claims.

Throughout the drawings, identical reference numbers designate similar, but not necessarily identical, elements.

DETAILED DESCRIPTION

The UEFI network stack may provide support for booting over network through the preboot execution environment (PXE). The UEFI network stack may include a network interface controller hardware driver, a simple network protocol (SNP) driver or managed network protocol (MNP) driver, a transmission control protocol/internet protocol (TCP/IP) network stack using both internet protocol version 4 (IPv4) and internet protocol version 6 (IPv6) that allows both transmission control protocol (TCP) and user datagram protocol (UDP) traffic. UDP traffic, along with dynamic host configuration protocol (DHCP), may be used to enable trivial file transfer protocol (TFTP) file transfer with preboot execution environment (PXE) booting.

With a built-in network stack and an embedded shell environment the UEFI specifications are becoming a component of relatively more server management environments UEFI specification includes support for booting over network through the Preboot eXecution Environment (PXE). The PXE relies on a combination of Internet protocols such as user datagram protocol (UDP), dynamic host configuration protocol (DHCP) and trivial file transfer protocol (TFTP) to boot a software assembly on PXE enabled computing devices. Hypertext transfer protocol (Secure) (HTTP(s)) drivers and file transfer protocol (Secure) (FTP(s)) drivers may be built onto the UEFI stack that enables file transfers over TCP. Along with a domain name system (DNS) driver and a transport layer security (TLS) driver, the UEFI stack allows for secure network transfers of files from HTTP(s) and FTP(s) servers, in this case UDP is replaced by TCP and TFTP is replaced with HTTP(s) and FTP(S). Additionally, addressability of downloader servers are enhanced using the DNS drivers.

However a computing system with the UEFI network stack as described above has its limitations. The above UEFI network stack does not allow for booting an entire ISO image including a bootstrap program and all OS files in the single ISO image. Additionally, the UEFI network stack does not allow for that ISO image to be mounted as a random-access memory (RAM) drive to the local memory and boot from that memory. With this ability, a network administrator may copy to an ISO server the ISO of a specific operating system for deployment among any number of computing devices communicatively coupled over the network with the ISO server. This allows for a single boot target for all computing devices. In this case, no HTTP and PXE script configuration is done. Instead, the entire ISO is downloaded and mounted to the computing device for a relatively quick booting process. Consequently, a network administrator, using a management computing device, may access any number of computing devices across a network and use a single location from which all of the connected computing devices may have a copy of an ISO uploaded and mounted to each computing device for relatively easy deployment. This further decreases the streaming traffic flow of data over, for example, a management network, operated by a network administrator using a management client.

The present specification therefore describes system for securely and reliably transferring startup script files over a network, including a unified extensible firmware interface (UEFI) network stack on a client server wherein the client server requests startup script over the network upon startup of the client server using a secure transfer network protocol and receives over the network the startup script.

The present specification further describes a computing device, including a unified extensible firmware interface (UEFI) shell to request to download, over a network, startup script upon startup of the client server wherein the startup script is staged in a provisioned storage device within the client server to be mounted as local file systems in the client server.

The present specification also describes a computer program product for securely and reliably transferring startup script files over a network, the computer program product including a computer readable storage medium including computer usable program code embodied therewith, the computer usable program code that, when executed by a processor request startup script for a client server over the network upon startup of the client server using a secure transfer network protocol, receive the startup script over the network and stage the startup script in a provisioned storage device within the client server, and mount the startup script as a local file in the local file system of the client server In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims, the term "a number of" or similar language is meant to be understood broadly as any positive number including 1 to infinity; zero not being a number, but the absence of a number.

Figure 1:
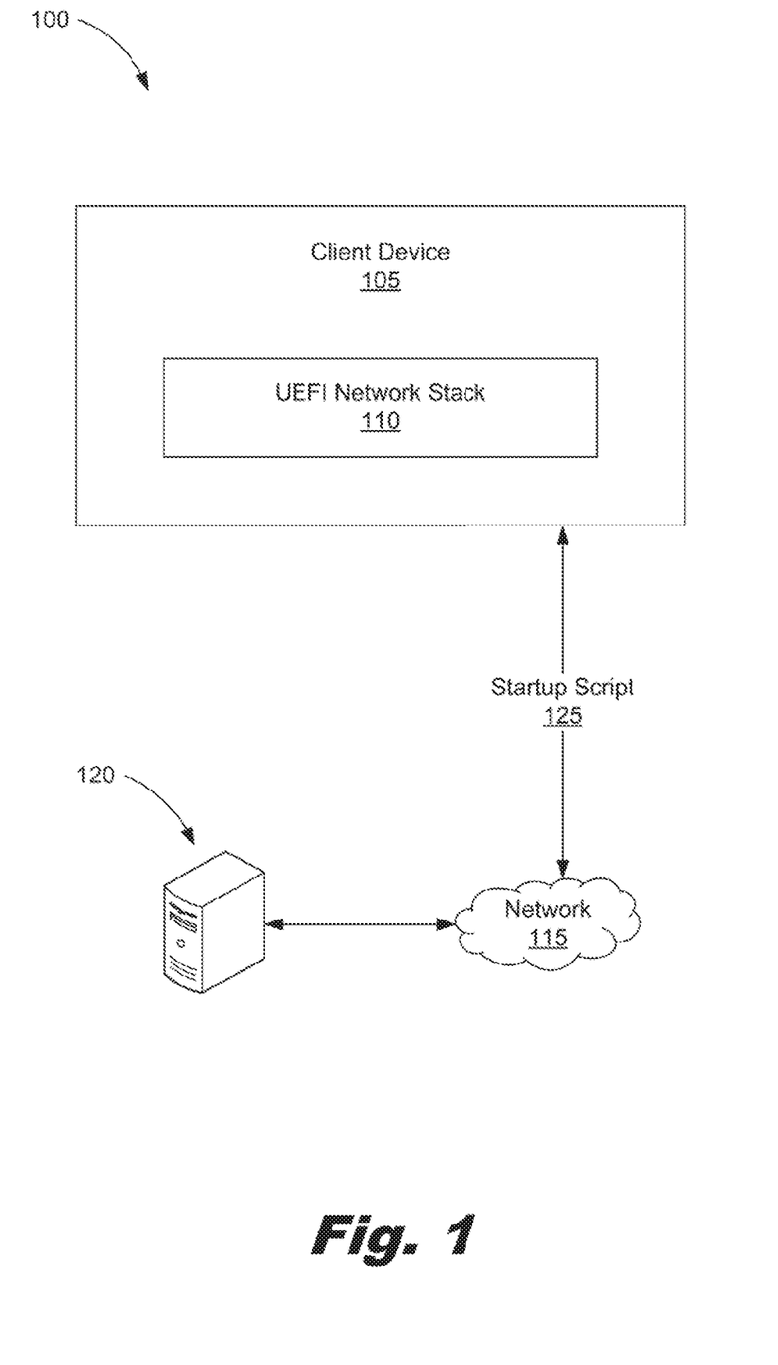
FIG. 1 is a block diagram of a system for securely and reliably transferring startup script files over a network according to one example of principles described herein.

FIG. 1 is a block diagram of a system (100) for securely and reliably transferring startup script files (125) over a network (115) according to one example of principles described herein. The system (100) may include a client device (105) onto which the startup files (125) may be uploaded. The client device (105) may be any type of computing device, in one example, the client device (105) is a client server. Other examples of a client device include desktop computers, laptop computers, personal digital assistants (PDAs), mobile devices, smartphones, gaming systems, and tablets, among other electronic devices.

Figure 2:
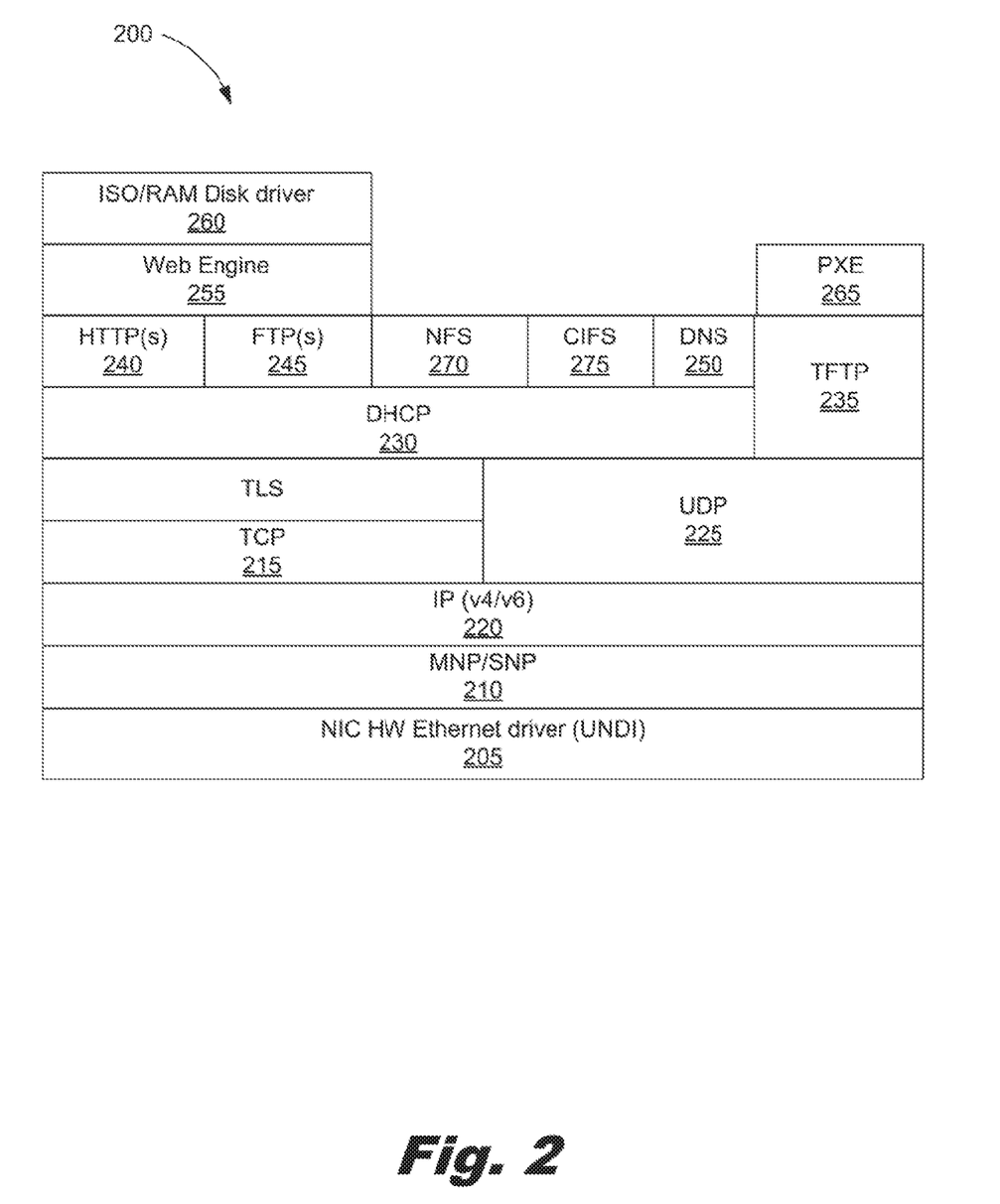
FIG. 2 is a block diagram of a unified extensible firmware interface (UEFI) network stack (200) according to one example of the principles described herein.

The client device (105) includes a UEFI network stack (110). As describe above, the UEFI network stack may include a number of firmware, software, and drivers to request startup script from a server (120) over the network (115). FIG. 2 is a block diagram of a unified extensible firmware interface (UEFI) network stack (200) according to one example of the principles described herein. The UEFI network stack (200) of FIG. 2 will now be described in connection with the UEFI network stack (110) and client device (105) shown in FIG. 1.

The UEFI network stack (200) may include a network interface controller hardware driver (205), a simple network protocol (SNP) driver or managed network protocol (MNP) driver (210), a transmission control protocol/internet protocol (TCP/IP) network stack (215) using both internet protocol version 4 (IPv4) and internet protocol version 6 (IPv6) (220) that allows both transmission control protocol (TCP) and user datagram protocol (UDP) (225) traffic. UDP traffic, along with dynamic host configuration protocol (DHCP) (230), may be used to enable trivial file transfer protocol (TFTP) file transfer (235) with preboot execution environment (PXE) (265) booting.

Additionally, the UEFI network stack (200) may include hypertext transfer protocol (Secure) (HTTP(s)) drivers (240) and file transfer protocol (Secure) (FTP(s)) drivers (245) that enable file transfers over TCP (215). A domain name system (DNS) driver (250) may be added to enable addressability of any number of servers hosting any type of startup script such as an ISO image. This also allows for a specific URL to be programed into the client device (105) such that, at startup, the client device (105) uses the URL to search across the network (115) and download an ISO image. A web engine layer (255) may be built on top of the hypertext transfer protocol (Secure) (HTTP(s)) drivers (240) and file transfer protocol (Secure) (FTP(s)) drivers (245) to abstracts the file transfers via HTTP(s) and FTP(S) and obtain the files through a single application programming interface (API).

On top of the web engine (255) is built an ISO/RAM Disk driver (260) to mount a downloaded ISO file to memory on the client device (105) and boot from that memory, in this example, the memory may be any type of volatile memory. In one example, the memory is RAM (333) such that a downloaded ISO file is mounted such that it appears to the client device (105) that the ISO file is a local file system such as a compact disc drive that is local to the client device (105).

The UEFI network stack (200) may further include a Network File System (NFS) protocol (270). The NFS (270) protocol may allow a network administrator on a management client device to access files on a server over a network. The network administrator may view and interact with mounted file systems on a server connected to the network as well as remotely manage a client device communicatively coupled to the network to do the same.

The UEFI network stack (200) may also include a common internet file system (CIFS) driver (275). The CIFS driver (275) may provide to the management client as well as a number of computer clients coupled to the network shared access to files, printers, serial ports, and other communication nodes associated on the network.

The network (115) described herein may be any type of network. Examples of the network (115) may include a computing network, a public cloud network, a local area network (LAN), a wide area network (WAN), a private cloud network, a hybrid cloud network, other forms of networks, or combinations thereof.

Figure 3:
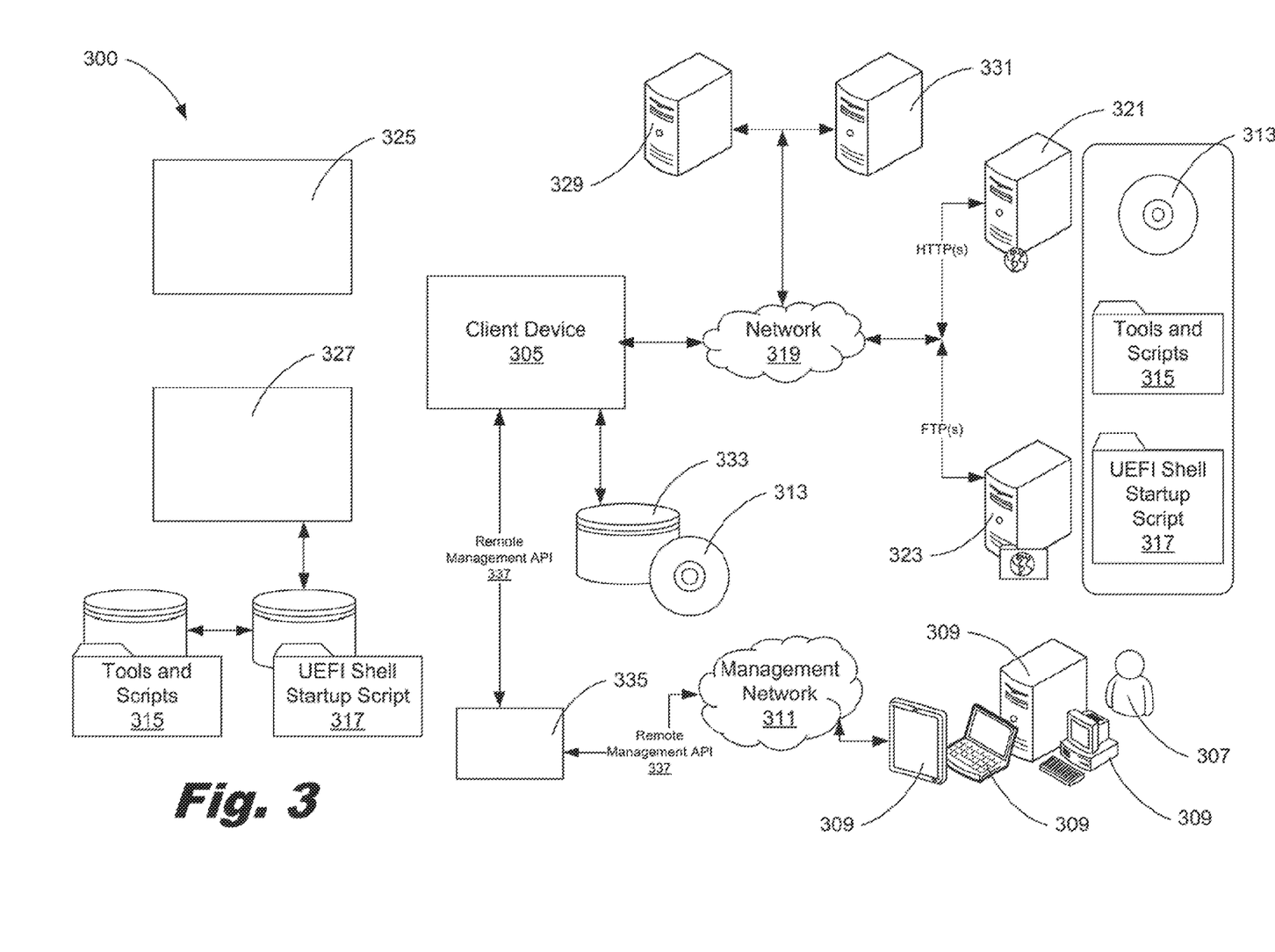
FIG. 3 is a block diagram of a system for securely and reliably transferring startup script files over a network according to another example of principles described herein.

FIG. 3 is a block diagram of a system (300) for securely and reliably transferring startup script files over a network according to another example of principles described herein. The system (300) shows a client device (305) as described in connection with FIG. 1 and may include the UEFI network slack (200) as described in connection with FIG. 2.

During operation, and more specifically during a boot process, the client device (305) can download a number of files (313, 315, 317) over the network (319) using an HTTP, HTTPs, TFTP, NFS, CIFS, FTP, or FTPs protocol. In one example, when the UEFI shell displayed on a user display device associated with the client device (305) starts, it begins to search for a startup script (317). In this example, a priority list may be programmed into the BIOS indicating to what sources the shell is to look to for a startup script (317). Some client devices (305) such as a server do not include any media devices communicatively coupled to the device (305) and as such do not have startup script (317) located on a memory of the client device (305). In this situation, when the shell starts, the shell looks over the network (319) to find the startup script (317). FIG. 3 shows this shell startup script (317) located on either an HTTP server (321). FTP server (323), a TFTP server, a NFS server, or a CIFS server. Here, the shell (325), upon startup, automatically, downloads that UEFI shell startup script (317).

In one example, the UEFI shell (325) may be preconfigured using either a UEFI pre-boot user interface (325) or a scriptable configuration user interface (327) accessed by a management client (309) using a remote management API (337) such as RESTful API, intelligent platform management interface (IPMI), or web-service management (WS-MAN) API. A baseboard management controller (BMC) or service processor (335) may expose the remote management API (337) such that the remote management API (337) can be exposed out-of-band to the management client (309) as well as in-band to the client device (305). As will be described below, a RESTful Client shell command may be implemented by the client device (305) to use the in-band management API (337) such as an in-band RESTful API to communicate with the BMC/service processor (335) to perform system configuration. The preconfiguration of the shell may point to a network location where the UEFI shell startup script (317) exists.

Where the UEFI shell is preconfigured using scriptable configuration user interface (327), a network administrator (307) may use a management client (309) to access a client device (305) using a maintenance operation protocol. The management client (309) may access the client device (305) via a management network (311). The communication between the management client (309) and the client device (305) may be completed using a secure communications protocol such as HTTPs. In this example, the network location of the UEFI shelf startup script (317) may be configured into the shell when the management client (309) accesses, the scriptable configuration user interface (327) using the out-of-band RESTful API. In this manner, the network administrator may send a command to the client device (305) to perform a one-time boot to the shell.

The UEFI shell on the client device (305) may also look at certain media storage locations to retrieve the UEFI shell startup script (317). In this example, a policy may be created such that the shell looks first to one of the local media in the client device (305), over the network (319), or some other location. This may allow a network administrator (307) to decide if a sole source of UEFI shell startup script (317) is to be located on either an HTTP server (321) or FTP server (323) across a network, if a local universal serial bus (USB) device is to be plugged into the client device (305) in order to prevent the UEFI shell from downloading an undesirable startup script over the network, or if the UEFI shell is to look at a number of sources in any given order to find the UEFI shell startup script (317).

Where the UEFI shell startup script (317) is located only across the network (319) the UEFI shell may be preconfigured to either look at a specific location over the network using the URL or access a DHCP server (329) for the UEFI shell startup script (317). Where the UEFI shell has been preconfigured to access the DHCP server (329), the UEFI shell startup script (317) may send a request along with a vendor tag. Where the DHCP server (329) recognize the vendor tag, the vendor tag may be used by the system (300) to verify that the authorized UEFI shell is attempting to locate its UEFI shell startup script (317). In response the DHCP server (329) may provide the shell of the client device (305) with the URL location of the UEFI shell startup script (317) whether it be located on the DHCP server (329), the HTTP server (321), the FTP server (323), or some other location such as a NFS server, a CIFS server, or a TFTP server. The DNS server (331) may be used by the DHCP server (329) to resolve the names of the URLs such as HTTP, FTP, NFS, and CIFS uniform resource locators (URLS). In one example, the DNS server (329) may be maintained by a distributed database system. Nodes within this database may be the name servers. Each domain may have at least one authoritative DNS server (329) that publishes information about that domain and the name servers of any domains subordinate to it. During operation, the DHCP server (329) may refer to the DNS server (331) to resolve the names of the URLs to which it wilt refer the client device (305) to for the UEFI startup script (317), the ISO image (313), and other tools and scripts (315) when the client device (305) has requested them.

Once the UEFI shell startup script (317) has been downloaded, any number of additional tools and scripts (315) with their respective commands may be downloaded to add additional functionality to the shell. These tools and scripts (315) will now be described in more detail using FIG. 4.

Figure 4:
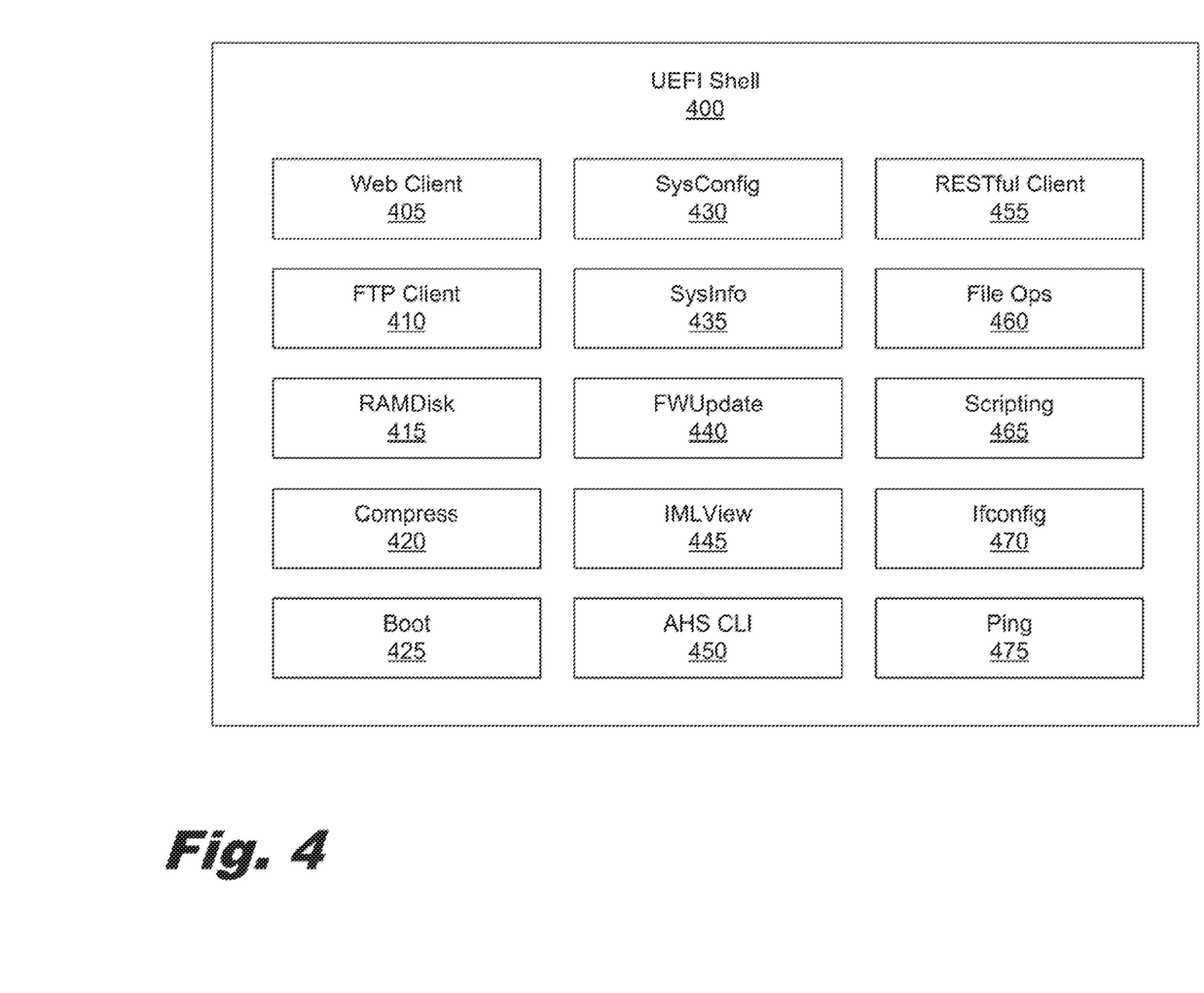
FIG. 4 is a block diagram showing a number of tools and scripts with a UEFI shell according to one example to of the principles described herein.

FIG. 4 is a block diagram showing a number of commands with a UEFI shell (400) according to one example to of the principles described herein. The number of commands added to the UEFI shell may be scripts downloaded by the client device (FIG. 3, 305) and may provide the UEFI shell with various capabilities to be used as a bare metal provision/deployment scriptable environment. The Web Client (405) and FTP commands (410) provide the UEFI shell (400) with the ability to download and upload files from the network using HTTP, HTTPs FTP, FTPs, TFTP, and NFS/CIFS mounted file systems as described above.

The RAMdisk command (415) provides the UEFI shell (400) with the ability to provision additional RAM disks (333) to store downloaded files and scripts. The provisioning of RAM (333) allows certain tools to be maintained on the UEFI shell (400) temporarily or at least until the client device (FIG. 3, 305) boots its operating system.

The Compress command (420) provides the UEFI shell (400) with the ability to compress and uncompressed files using a myriad of compression and archive formats such as .ZIP, .TAR, and .GZIP. This allows the UEFI shell startup script (317) to decompress the files if they are downloaded in compressed/archived format in order to save time during download.

The Boot command (425) provides the UEFI shell (400) with the ability to mount a downloaded ISO image into memory and boot to it. This command (425) further provides for the ability to transfer control and boot to any target without restarting the client device (FIG. 3, 305). This allows a transition to a non-UEFI boot operation without rebooting the client device (305).

The Web Client (405) FTP (410), RAMdisk (415). Compress (420), and Boot (425) commands are embedded into the shell for the shell to download other commands and scripts.

The SysConfig (430) (BIOS system configuration), SysInfo (435) (hardware inventory using system information), FWUpdate (440) (firmware update), IMLView (445) (integrated management log view), AHS CLI (450) (download support information), and RESTful Client (455) (connect to the RESTful API from the shell) provide additional functionality to the UEFI shell (400). The RESTful Client (455) shell command may be implemented by the client device (FIG. 3, 305) to use the in-band management API (FIG. 3, 337) such as an in-band RESTful API to communicate with the BMC (FIG. 3, 335) to perform system configuration. Additional tools and scripts (315) may be downloaded to the UEFI shell (400) to provide a myriad of functionality. In one example a number of maintenance commands may be provided to collect error and service logs over the network from a number of nodes communicatively coupled to the network, inventory hardware on the network, and troubleshooting information. Each tool and script (315) may be developed by the network manager (307) and saved to the tools and scripts (315) located on the HTTP(s) server (321) and/or FTP(s) server (323).

Figure 5:
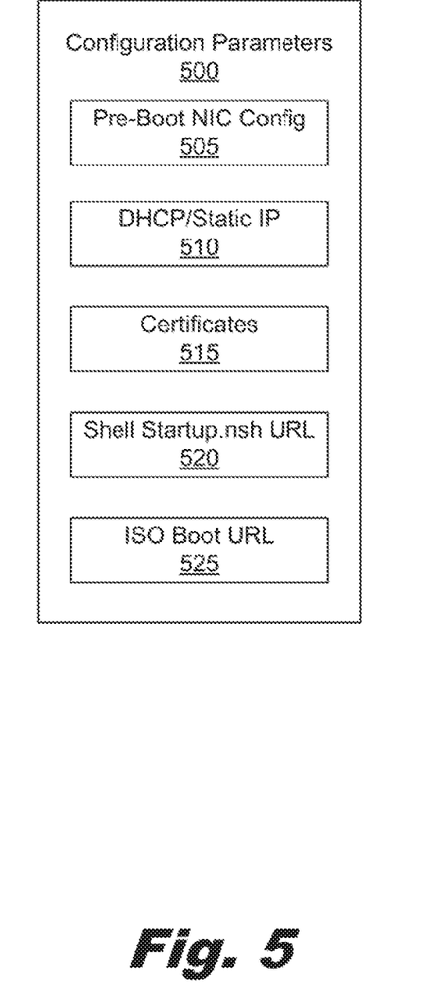
FIG. 5 is a block diagram showing a number of configuration parameters used to configure an infrastructure of a shell according to one aspect of the principles described herein.
Figure 6:
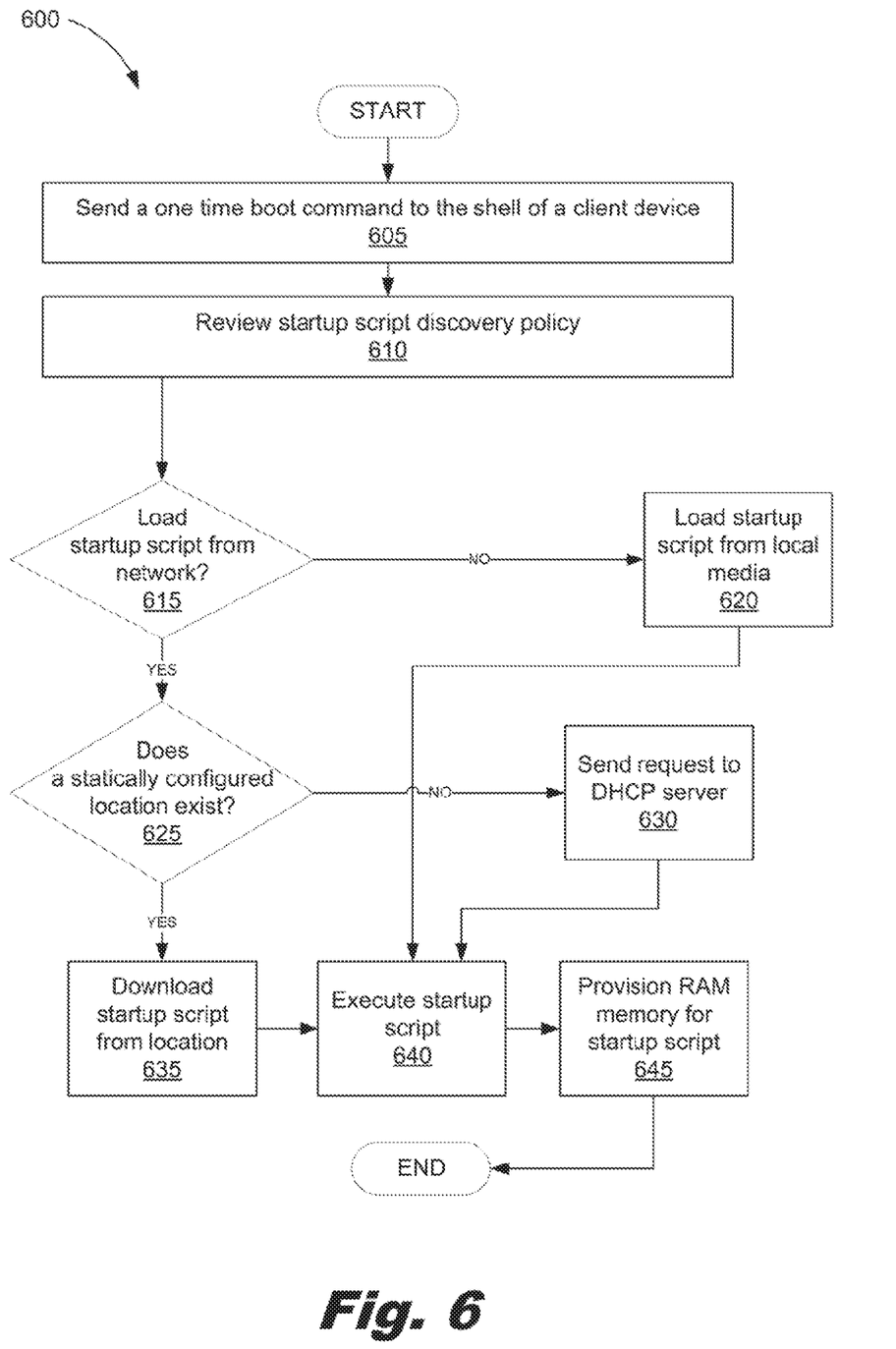
FIG. 6 is a flowchart showing a method of securely and reliably transferring startup script files over a network according to one example of principles described herein.

FIG. 5 is a block diagram showing a number of configuration parameters (500) used to configure an infrastructure of a shell according to one aspect of the principles described herein. The Pre-Boot NIC Config parameter (505) allows a user to decide which network card to use during pre-operating system deployment. Use of the pre-boot NIC Config parameter (505) allows a network manager (307) to either select a specific NIC/port interface for pre-boot processes or select an "Auto" selection which will allow the UEFI shell to automatically search for the first available network port with network connectivity and use it as the selected pre-boot network interface controller (NIC). The DHCP/Static IP parameter allows a user to set a determination as to whether the shell looks to a DHCP server (FIG. 3, 329) or from a static IP source. The Certificates parameter (515) allows a user to set certificates for the TLS and SSL connections in the system (300). This allows a user to determine whether the communications will be encrypted and add certificates for the encryptions. The Shell Startup.nsh URL parameter allows a user to set a shell policy for startup (search local then network, network only, local only, network then local, etc. for startup scripts) as well as determine if the shell is to use static IP lookup or send a request to the DHCP server (FIG. 3, 329) for the URL to the startup script. The ISO Boot URL parameter allows a user to set a policy as to if the shell is to use static IP lookup or send a request to the DHCP server for the ISO FIG. 6 is a flowchart (600) showing a method of securely and reliably transferring startup script files over a network according to one example of principles described herein. The method (600) may begin with a boot command being sent (605) to the shell of a client device. The boot command may be sent (605) to the client device in order to prevent tire client device from booting its operating system. The method (600) may continue with the shell reviewing (610) the startup script discovery policy as described above. Here, the shell may determine if 1) the policy indicates that the startup script is to be searched for in the network first before local storage devices are checked, 2) the policy indicates that the startup script is to be searched for in the local storage first before the network is checked, 3) only the network is to be check, or 4) only the local storage is to be checked for the startup script. It is then determined (515) if the shell is to load the startup script from the network. If the policy does not indicate as such (NO determination, 615), the local storage is checked for the startup script and loaded (620) when found.

If the policy does indicate that the startup script is to be loaded from the network (YES determination, 615), it is then determined (625) whether the shell has been preconfigured with a statically configured location. As described above, the user was provided with the option to set a predefined URL location on a UEFI pre-boot user interface (325; or a scriptable configuration user interface (327) indicating where, over the network, the startup script could be found and downloaded. If it has been determined that the shell has not been preconfigured with a statically configured location (NO, determination 625). Then a request is sent to the DHCP server (FIG. 3, 329) along with a vendor tag as described above. If it has been determined that the shell has been preconfigured with a statically configured location (YES, determination 625), then the URL is used to download (635) the startup script from that specific URL location.

Wherever the startup script is found, it is then executed (640) on the client device and a portion or RAM on the client device is provisioned (645) for the startup script as described above.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, a processor of the client device (105) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a system for securely and reliably transferring startup script ties over a network. The system provides for a relatively shorter overall deployment time of startup script or a given client device. In comparison to an average deployment time of 45 minutes using PXE boot, a deployment time using the present system was under 5 minutes. Additionally, with HTTPs/FTPs connections, the communication links between the client device and servers across the network may be encrypted allowing for greater security. Further, the system provides for a level of scalability through the use of HTTP and FTP downloads that use TCP connections. TCP connections tend to be more reliable and scalable in very large/dense data center. TCP also offers congestions control, retries, and handshakes. Even further, the system provides for relatively better network download performance. Performance improvements of the present network stack of the system resulted in 4× performance gain, resulting in a download time of a 4 GB filed over a 1 bps Ethernet link from 260 seconds to 65 seconds.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system comprising:
    a processor;
    a unified extensible firmware interface (UEFI) network stack; and
    a non-transitory storage medium storing instructions executable on the processor to:
        during startup of the system:
            execute a UEFI shell that provides an output for a display device,
            identify a location of a startup script,
            request, by the UEFI shell, the startup script at the identified location over a network using a secure transfer network protocol of the UEFI network stack,
            receive, over the network, the startup script, and
            download commands comprising a boot command to the UEFI shell to add functionality to the UEFI shell, wherein, after the downloading of the commands, the UEFI shell comprises the boot command, and wherein the boot command when invoked downloads an image comprising a bootstrap program to a memory of the system, the bootstrap program for booting the system.

2. The system of claim 1, wherein the instructions are executable on the processor to:
    access, by the UEFI shell, a policy specifying an order of locations for searching for the startup script, the locations comprising a local storage of the system and a storage accessible over the network,
wherein the identifying of the location of the startup script is based on searching for the startup script at the locations specified by the policy.

3. The system of claim 1, wherein the commands downloaded to the UEFI shell comprise a further command that when invoked provisions an additional memory.

4. The system of claim 3, wherein, after the downloading of the commands, the UEFI shell comprises the boot command and the further command.

5. The system of claim 2, wherein the UEFI shell is to request the startup script using transport layer security (TLS).

6. The system of claim 1, wherein the instructions are executable on the processor to stage the startup script in a provisioned storage device of the system, the startup script to be mounted as a file in a local file system in the system.

7. The system of claim 6, wherein the provisioned storage device comprises a random-access memory (RAM) disk device.

8. The system of claim 1, wherein the UEFI network stack comprises one or more of a hypertext transfer protocol (HTTP) layer, a hypertext transfer protocol secure (HTTPS) layer, a file transfer protocol (FTP) layer, a trivial file transfer protocol (TFTP) layer, a file transfer protocol secure (FTPS) layer, a network file system (NFS), and a common internet file system (CIFS).

9. The system of claim 1, wherein the UEFI shell is to:
request the location of the startup script from a dynamic host configuration protocol (DHCP) server, and
receive, from the DHCP server, a reply responsive to the request, the reply comprising a uniform resource locator (URL) address of the startup script.

10. The system of claim 1, wherein the startup script comprises instructions to download additional UEFI scripts.

11. The system of claim 1, wherein the UEFI shell comprises a uniform resource locator (URL) describing where, across the network, the startup script is located, and wherein the identifying of the location of the startup script uses the URL in the UEFI shell.

12. The system of claim 1, wherein the commands downloaded to the UEFI shell comprise scripts.

13. A non-transitory machine-readable storage medium comprising instructions that upon execution cause a system to:
during startup of the system:
execute a unified extensible firmware interface (UEFI) shell that provides an output for a display device;
identify a location of a startup script;
request, by the UEFI shell, the startup script at the identified location over a network using a secure transfer network protocol of a UEFI network stack;
receive, over the network, the startup script; and
download commands comprising a boot command to the UEFI shell to add functionality to the UEFI shell, wherein, after the downloading of the commands, the UEFI shell comprises the boot command, and wherein the boot command when invoked downloads an image comprising a bootstrap program to a memory of the system, the bootstrap program for booting the system.

14. The non-transitory machine-readable storage medium of claim 13, wherein the instructions upon execution cause the system to:
access, by the UEFI shell, a policy specifying an order of locations for searching for the startup script, the locations comprising a local storage of the system and a storage accessible over the network,
wherein the identifying of the location of the startup script is based on searching for the startup script at the locations specified by the policy.

15. The non-transitory machine-readable storage medium of claim 13, wherein the commands downloaded to the UEFI shell comprise a further command that when invoked provisions an additional memory, and wherein, after the downloading of the commands, the UEFI shell comprises the boot command and the further command.

16. The non-transitory machine-readable storage medium of claim 13, wherein the commands downloaded to the UEFI shell comprise a command that when invoked provisions the memory to mount the image as a local file system of the system.

17. A method comprising:
during startup of a system:
executing, at the system, a unified extensible firmware interface (UEFI) shell that provides an output for a display device;
identifying, by the system, a location of a startup script;
requesting, by the UEFI shell, the startup script at the identified location over a network using a secure transfer network protocol of a UEFI network stack;
receiving, at the system over the network, the startup script; and
downloading, by the system, commands comprising a boot command to the UEFI shell to add functionality to the UEFI shell, wherein, after the downloading of the commands, the UEFI shell comprises the boot command, and wherein the boot command when invoked downloads an image comprising a bootstrap program to a memory of the system, the bootstrap program for booting the system.

18. The method of claim 17, further comprising:
accessing, by the UEFI shell, a policy specifying an order of locations for searching for the startup script, the locations comprising a local storage of the system and a storage accessible over the network,
wherein the identifying of the location of the startup script is based on searching for the startup script at the locations specified by the policy.

19. The method of claim 17, wherein the commands downloaded to the UEFI shell comprise a further command that when invoked provisions an additional memory, and wherein, after the downloading of the commands, the UEFI shell comprises the boot command and the further command.

20. The method of claim 17, wherein the commands downloaded to the UEFI shell comprise a command that when invoked provisions the memory to mount the image as a local file system of the system.

* * * * *